(12) United States Patent
Bittner et al.

(10) Patent No.: US 8,490,595 B2
(45) Date of Patent: Jul. 23, 2013

(54) FASTENING SYSTEM

(75) Inventors: Roxann M. Bittner, Royal Oak, MI (US); Leonard Barry Griffiths, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 562 days.

(21) Appl. No.: 12/713,579

(22) Filed: Feb. 26, 2010

(65) Prior Publication Data
US 2011/0209681 A1 Sep. 1, 2011

(51) Int. Cl.
F02B 77/00 (2006.01)

(52) U.S. Cl.
USPC ...................................... 123/195 C; 411/531

(58) Field of Classification Search
USPC ......... 174/50, 481, 17 R, 50.5, 480; 411/546, 411/531, 353; 123/195 C, 198 E, 90.37, 90.38; 16/429, 2.1
See application file for complete search history.

(56) References Cited

U.S. PATENT DOCUMENTS

| | | | |
|---|---|---|---|
| 3,263,728 A * | 8/1966 | Lynch | 411/349 |
| 4,118,041 A | 10/1978 | Futamura | |
| 4,232,496 A | 11/1980 | Warkentin | |
| 4,456,268 A | 6/1984 | Penn et al. | |
| 4,867,461 A | 9/1989 | Shimmell | |
| 7,261,489 B2 * | 8/2007 | Arbona et al. | 403/381 |

FOREIGN PATENT DOCUMENTS

| | | | |
|---|---|---|---|
| CN | 1207457 A | | 2/1999 |
| JP | 11062739 A | * | 3/1999 |
| JP | 2000170604 A | * | 6/2000 |

* cited by examiner

*Primary Examiner* — Noah Kamen
(74) *Attorney, Agent, or Firm* — Quinn Law Group PLLC

(57) ABSTRACT

A fastening apparatus includes a compression limiting member having a dowel portion and a belleville washer portion. A first member defines a first hole, a second member defines a second hole, a third member defines a third hole, and the dowel portion defines a fourth hole. The second member is between the first and third members, and the dowel portion extends through the second hole. The dowel portion is substantially rigid to prevent excessive compression of the second member between the first and third members. The belleville washer portion is elastically compressed between the second and third members such that the washer portion biases the second member toward the first member.

10 Claims, 1 Drawing Sheet

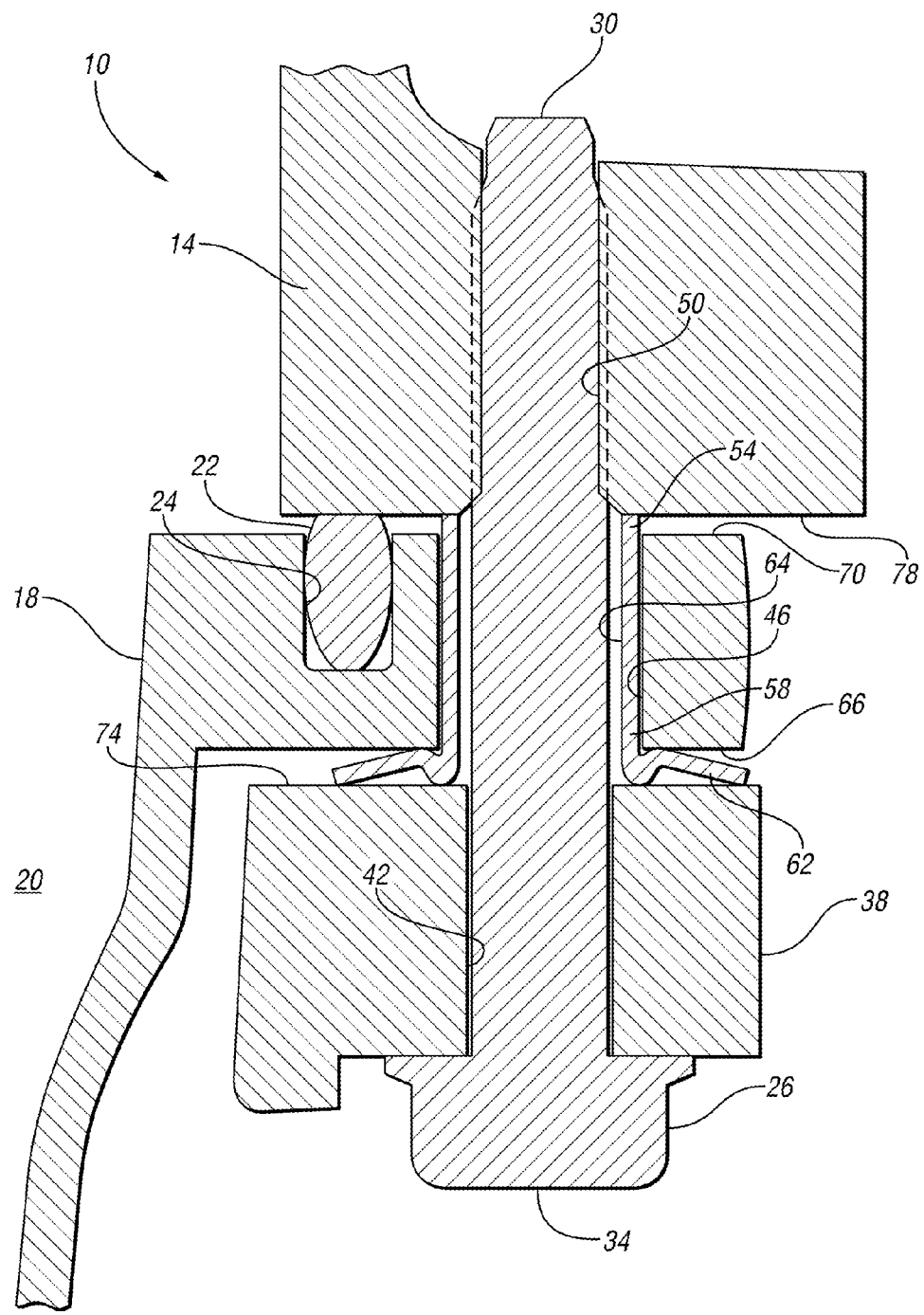

FASTENING SYSTEM

TECHNICAL FIELD

This invention relates to fastening systems configured to fasten parts having differing material compositions.

BACKGROUND OF THE INVENTION

Engines typically include an engine block having an oil pan mounted thereto. The oil pan defines a sump that collects lubricating oil falling from the engine cylinders, connecting rods, and crankshaft for further recirculation, such as via an oil pump.

SUMMARY OF THE INVENTION

According to a first aspect of the disclosure, an apparatus includes a metallic first member defining a first hole; a second member comprising a polymeric material and defining a second hole; a metallic third member defining a third hole; a metallic fourth member having a dowel portion and a belleville washer portion; an elastomeric seal disposed between the first member and the second member; and a bolt. The dowel portion extends through the second hole, defines a fourth hole, and contacts the first and third members. The bolt extends into the first, second, third, and fourth holes to fasten the first, second, and third members together. The belleville washer portion is elastically compressed between the second member and the third member, which maintains compression of the seal between the first and second members. The dowel portion provides metal-to-metal contact between the first and third members to prevent the bolt from loosening and to limit compression of the polymeric second member between the first and third members.

According to a second aspect of the disclosure, an apparatus includes an engine block defining a first hole; an oil pan defining a second hole; a brace defining a third hole; a member having a dowel portion and a belleville washer portion; and a bolt. The dowel portion defines a fourth hole, extends through the second hole, and contacts the brace and the engine block. The belleville washer portion extends between the oil pan and the brace and is elastically compressed. The bolt extends through the first, second, third, and fourth holes to fasten the brace and the oil pan to the engine block.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The FIGURE is a schematic, cross-sectional view of an oil pan mounted to an engine block.

DESCRIPTION OF THE PREFERRED EMBODIMENTS

Referring to The FIGURE, an engine 10 includes a metallic first member, i.e., engine block 14, which defines a plurality of cylinders (not shown). The engine 10 further includes a second member, i.e., oil pan 18, mounted with respect to the underside of the engine block 14, as understood by those skilled in the art. The oil pan 18 and the engine block 14 cooperate to at least partially define a crankcase 20. The crankshaft (not shown) of the engine 10 is disposed within the crankcase 20. The oil pan 18 defines an oil reservoir or sump at the base of the crankcase 20, as understood by those skilled in the art. A windage tray (not shown) may be disposed within the crankcase 20 to separate the crankshaft and the oil pan 18 within the scope of the claimed invention.

An elastomeric seal 22 is compressed between the oil pan 18 and the block 14. In the embodiment depicted, the oil pan 18 defines a groove 24 in which the seal 22 is disposed. The seal 22 is configured to prevent contaminants from entering the crankcase 20, and to prevent leakage of oil from the crankcase 20. Accordingly, the oil pan 18 should be attached to the block 14 in a manner that maintains compression of the seal 22. More specifically, a plurality of bolts, only one of which is shown at 26, operatively connects the oil pan 18 to the engine block 14. The bolt 26 includes a threaded shaft 30 and a polygonal head 34.

A third member, i.e., aluminum brace 38, defines a hole 42. The oil pan 18 defines a hole 46. The engine block 14 defines a threaded hole 50. Holes 42, 46, and 50 are coaxially aligned such that the shaft 30 of the bolt 26 extends through holes 42, 46, and extends at least partially into hole 50 to engage the threads therein. The head 34 abuts the brace 38. A compression-limiting member 54 includes a cylindrical dowel portion 58 and a belleville washer portion 62. In the embodiment depicted, the dowel portion 58 and the washer portion 62 are formed from a single piece of material; however, and within the scope of the claimed invention, the dowel portion and washer portion may be formed from separate piece of material. The compression-limiting member 54 is metallic.

The dowel portion 58 defines a hole 64 extending therethrough. The dowel portion 58 is disposed within the hole 46 of the oil pan 18, and the shaft 30 of the bolt 26 extends through the hole 64 of member 54. The oil pan 18 defines surfaces 66, 70, which face opposite directions from one another. Hole 46 extends from surface 66 to surface 70. Surface 66 of the oil pan 18 faces surface 74 of the brace 38. Surface 74 of the brace surrounds an opening of hole 42. Surface 70 of the oil pan 18 face surface 78 of the engine block 14. Surface 78 surrounds an opening of hole 50 and contacts the seal 22.

The diameter of the hole 64 defined by the dowel portion 58 is greater than the diameters of holes 42 and 50. The length of the dowel portion 58 is greater than the distance from surface 66 to surface 70, and thus the dowel portion 58 contacts surface 74 of the brace 38 and surface 78 of the engine block 14. The dowel portion 58 is substantially rigid, and thus limits compression of the oil pan 18 between the brace 38 and the engine block 14. More specifically, the dowel portion 58 carries the compressive load applied by the bolt 26 between the brace 38 and the engine block 14. The thickness of the walls of the dowel portion 58 are sufficiently thick to prevent brinelling of the surface 78 of the engine block 14. The belleville washer portion 62 is a belleville spring, which is elastically compressed between surfaces 66 and 74. Thus, the washer portion 62 urges the oil pan 18 away from the brace 38 and toward the engine block 14, thereby maintaining a compressive force on the seal 22.

In the embodiment depicted, the oil pan 18 comprises a polymeric material, and, more specifically, a thermoplastic composite material having a polymeric matrix. The dowel portion 58 prevents the bolt 26 from loosening by providing metal-to-metal contact between the engine block 14 and the brace 38. The dowel portion 58 also prevents excessive compression (and corresponding deformation) of the oil pan 18 by maintaining a minimum distance between the engine block 14 and the brace 38. The belleville washer portion 62 maintains a sufficient compressive force on the seal 22. The belleville washer portion 62 also removes manufacturing and assembly tolerances at installation, and dynamically compensates for thermal expansion, thermal contraction, and creep deformation of the oil pan 18.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
   a metallic first member defining a first hole;
   a second member comprising a polymeric material and defining a second hole;
   a metallic third member defining a third hole;
   a metallic fourth member having a dowel portion and a belleville washer portion;
   an elastomeric seal disposed between the first member and the second member; and
   a bolt;
   wherein the second member is between the first and third members;
   wherein the dowel portion extends through the second hole, defines a fourth hole, and contacts the first and third members;
   wherein the bolt extends into the first, second, third, and fourth holes; and
   wherein the belleville washer portion is elastically compressed between the second member and the third member.

2. The apparatus of claim 1, wherein the first hole is threaded, and wherein the bolt is threaded.

3. The apparatus of claim 1, wherein the second member defines a groove; and wherein the seal is at least partially disposed within the groove.

4. The apparatus of claim 1, wherein the second member comprises a composite material having a polymeric matrix.

5. An apparatus comprising:
   an engine block defining a first hole;
   an oil pan defining a second hole;
   a brace defining a third hole;
   a member having a dowel portion and a belleville washer portion; and
   a bolt;
   wherein the dowel portion defines a fourth hole, extends through the second hole, and contacts the brace and the engine block;
   wherein the belleville washer portion extends between the oil pan and the brace and is elastically compressed; and
   wherein the bolt extends through the first, second, third, and fourth holes.

6. The apparatus of claim 5, wherein the oil pan comprises a polymer.

7. The apparatus of claim 6, wherein the oil pan comprises a composite material.

8. The apparatus of claim 6, wherein the block and the brace comprise a metallic material.

9. The apparatus of claim 5, further comprising an elastomeric seal compressed between the block and the oil pan.

10. The apparatus of claim 9, wherein the oil pan defines a groove; and
    wherein the seal is at least partially disposed within the groove.

* * * * *